United States Patent
You et al.

(10) Patent No.: US 10,025,023 B2
(45) Date of Patent: Jul. 17, 2018

(54) LIGHT GUIDE PLATE INCLUDING ABSORPTION PATTERN AND DISPLAY DEVICE HAVING THE SAME

(71) Applicant: Samsung Display Co., Ltd., Yongin-Si, Gyeonggi-Do (KR)

(72) Inventors: Junwoo You, Seongnam-si (KR); Young-min Park, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 106 days.

(21) Appl. No.: 15/059,426

(22) Filed: Mar. 3, 2016

(65) Prior Publication Data
US 2017/0017030 A1    Jan. 19, 2017

(30) Foreign Application Priority Data

Jul. 17, 2015  (KR) .................. 10-2015-0101935

(51) Int. Cl.
*F21V 7/04*     (2006.01)
*F21V 8/00*     (2006.01)

(52) U.S. Cl.
CPC ......... *G02B 6/0061* (2013.01); *G02B 6/0038* (2013.01); *G02B 6/0041* (2013.01); *G02B 6/0065* (2013.01)

(58) Field of Classification Search
CPC .... G02B 6/0038; G02B 6/004; G02B 6/0041; G02B 6/0043; G02B 6/0058; G02B 6/0061; G02B 6/0063; G02B 6/0065
USPC ................................................. 362/623–627
See application file for complete search history.

(56) References Cited

U.S. PATENT DOCUMENTS

| 6,905,220 B2 * | 6/2005 | Wortman ............... B32B 27/36 362/627 |
| 7,085,460 B2 * | 8/2006 | Leu ...................... G02B 6/0043 385/120 |
| 2005/0002174 A1 * | 1/2005 | Min ..................... G02B 6/0038 362/609 |
| 2006/0146573 A1 * | 7/2006 | Iwauchi .............. G02B 6/0018 362/621 |
| 2008/0304282 A1 | 12/2008 | Mi et al. |
| 2011/0305002 A1 | 12/2011 | Lim et al. |

FOREIGN PATENT DOCUMENTS

| JP | 2005-347010 A | 12/2005 |
| JP | 2007-025285 A | 2/2007 |
| KR | 1020130120486 A | 11/2013 |
| KR | 1020150011174 A | 1/2015 |

* cited by examiner

*Primary Examiner* — Jason M Han
(74) *Attorney, Agent, or Firm* — Cantor Colburn LLP (57) ABSTRACT

A display device includes a display panel which displays an image with light, a light guide plate through which the light is guided and which guides the light to the display panel, and an absorption filter provided in plural. The light guide plate defines a light exit surface thereof through which the light is emitted to the display panel and a rear surface thereof opposite to the light exit surface. The absorption filters are provided on the rear surface of the light guide plate. The absorption filters on the rear surface of the light guide plate each include a first filter layer and a second filter layer. The first filter layer has a first refractive index. The second filter layer is on the first filter layer and has a second refractive index lower than the first refractive index.

18 Claims, 8 Drawing Sheets

LIGHT GUIDE PLATE INCLUDING ABSORPTION PATTERN AND DISPLAY DEVICE HAVING THE SAME

This application claims priority to Korean Patent Application No. 10-2015-0101935, filed on Jul. 17, 2015, and all the benefits accruing therefrom under 35 U.S.C. § 119, the content of which in its entirety is herein incorporated by reference.

BACKGROUND (1) Field

The present disclosure herein relates to display devices, and more particularly, to display devices for which display quality thereof is improved.

(2) Description of the Related Art

Currently known display devices include liquid crystal displays ("LCDs"), plasma display panels ("PDPs"), organic light-emitting displays ("OLEDs"), field effect displays ("FEDs"), and electrophoretic displays ("EPDs").

Since a liquid crystal display ("LCD") is not self-emitting, the LCD includes a non-emissive display device for which a separate light source provides light thereto.

SUMMARY

One or more exemplary embodiment of the invention provides a display device for which display quality thereof is improved.

An exemplary embodiment of the invention provides a display device including a display panel which displays an image with light, a light guide plate through which the light is guided and which guides the light to the display panel, and an absorption filter provided in plural on the light guide plate. The light guide plate defines a light exit surface thereof from which the light is emitted to the display panel, and a rear surface thereof opposite to the light exit surface. The absorption filters are provided on the rear surface of the light guide plate. The absorption filters on the rear surface of the light guide plate each include a first absorption layer and a second absorption layer. The first absorption layer has a first refractive index. The second absorption layer is provided on the first absorption layer and has a second refractive index lower than the first refractive index.

In an embodiment, the light guide plate may further define a light entrance surface thereof and a light opposite surface thereof. The light entrance surface receives the light and connects the light exit surface and the rear surface to each other. The light opposite surface is opposite to the light entrance surface. Among the absorption filters on the rear surface of the light guide plate, a width of each absorption filter may increase from the light entrance surface toward the light opposite surface.

In an embodiment, among the absorption filters on the rear surface of the light guide plate, areas of the absorption filters may be the same as each other in a plan view.

In an embodiment, among the absorption filters on the rear surface of the light guide plate, in a plan view, each absorption filter may define a first width thereof at the light entrance surface and a second width thereof at the light opposite surface. A sum of the first width and the second width of any one absorption filter may be the same as a sum of the first width and the second width of an adjacent absorption filter.

In an embodiment, the first width may be smaller than the second width.

In an embodiment, among the absorption filters on the rear surface of the light guide plate, each absorption filter may have a trapezoidal shape in a plan view.

In an embodiment, the trapezoidal shape may define a first side thereof, a second side thereof, a third side thereof and a fourth side thereof. The first side is provided at the light entrance surface. The second side is provided at the light opposite surface. The third surface connects the first side and the second side to each other. The fourth side is spaced apart from the third side and connects the first side and the second side to each other. In a width direction of the absorption filter, a length of the first side may be smaller than a length of the second side.

In an embodiment, among the absorption filters on the rear surface of the light guide plate, respective sums of the lengths of the first sides and the second sides of the absorption filters may be the same as each other.

In an embodiment, an angle between the second side and the third side may be the same as an angle between the second side and the fourth side.

In an embodiment, among the absorption filters on the rear surface of the light guide plate, shapes of the absorption filters and planar sizes of the absorption filters defined by the shapes thereof may be respectively the same.

In an embodiment, among the absorption filters on the rear surface of the light guide plate, the absorption filters may be spaced apart from each other in a first direction and lengths thereof may extend in a second direction crossing the first direction.

In an embodiment, for each absorption filter among the absorption filters on the rear surface of the light guide plate, at least one of the first absorption layer and the second absorption layer is provided in plural.

In an embodiment, the first absorption layer may include at least one of $ZrO_2$ and polymethyl methacrylate.

In an embodiment, the second absorption layer may include at least one of $SiO_2$ and polyethylene naphthalate.

In an embodiment, the light guide plate may further define an optical pattern which is provided in plural and totally reflects the light guided by the light guide plate.

In an embodiment, the optical patterns may be defined at the light exit surface.

In an embodiment, the optical patterns may be defined at the rear surface.

In an embodiment, the light guide plate may include at least one of polycarbonate, polymethyl methacrylate, polydimethylsiloxane, polystyrene and methacrylate styrene.

In an embodiment, the display device may further include a light source unit. The light source unit may generate and provide the light to the light guide plate. The light provided by the light source unit may be white light.

An exemplary embodiment of the invention provides, a display device including a display panel which displays an image with light, a light guide plate through which the light is guided and which guides the light to the display panel and an absorption filter provided in plural. The light guide plate defines a light exit surface thereof from which light is emitted toward the display panel, a rear surface thereof opposite to the light exit surface, a light entrance surface thereof through which light is received and which connects the light exit surface and the rear surface to each other, and a light opposite surface thereof which is opposite to the light entrance surface and connects the light exit surface and the rear surface to each other. The absorption filters are provided on the rear surface. Among the absorption filters on the rear surface of the light guide plate, a width of each absorption filter increases from the light entrance surface toward the light opposite surface.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

The foregoing and other objects, features and advantages of the present disclosure will become more readily apparent from the following detailed description of exemplary embodiments of the invention that proceeds with reference to the appending drawings. The invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art.

In the drawings, like reference numerals refer to like elements throughout. In the accompanying drawings, the dimensions of structures are exaggerated for clarity. It will be understood that although the terms first and second are used herein to describe various elements, these elements should not be limited by these terms. These terms are only used to distinguish one element from another element. For example, a first element could be termed a second element, and, similarly, a second element could be termed a first element, without departing from the scope of the invention.

The terms of a singular form may include plural forms unless referred to the contrary. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

The meaning of "include," "comprise," "including," or "comprising," specifies a property, a fixed number, a step, a process, an element, a component, or a combination thereof but does not exclude other properties, fixed numbers, steps, processes, elements, components, or combinations thereof.

Also, it will be understood that when an element such as a layer, surface, or substrate is referred to as being "on" another element, it can be directly on the other element without intervening elements present therebetween or intervening elements may also be present therebetween. In contrast, when an element such as a layer, surface, or substrate is referred to as being "under" another element, it may be directly under the other element without intervening elements present therebetween or intervening elements may also be present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a display device according to the invention will be described.

Figure 1:
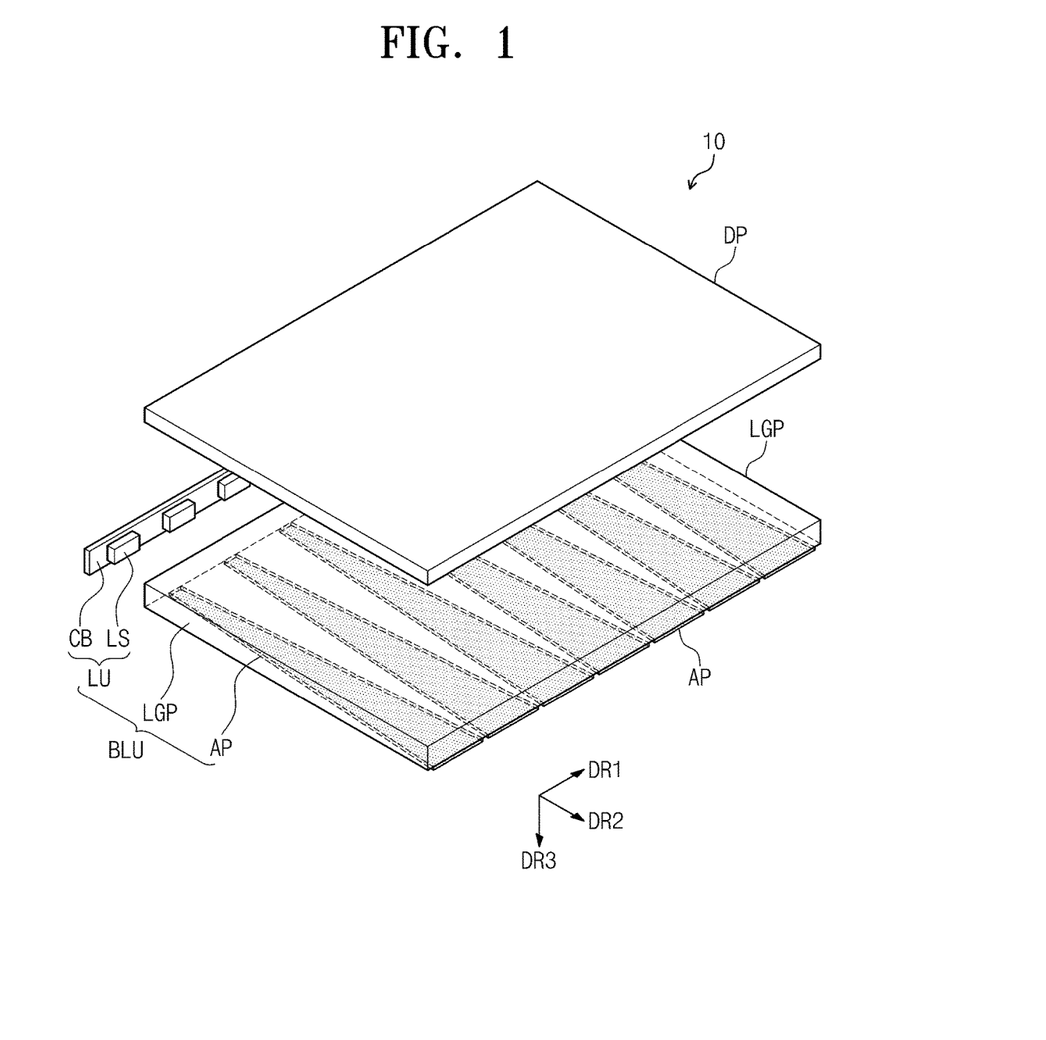
FIG. 1 is an exploded perspective view schematically illustrating an exemplary embodiment of a display device according to the invention.

FIG. 1 is an exploded perspective view schematically illustrating an exemplary embodiment of a display device 10 according to the invention.

Referring to FIG. 1, the display device 10 includes a backlight unit BLU and a display panel DP.

The backlight unit BLU includes a light source unit LU and a light guide plate LGP. The light source unit LU provides light. The light source unit LU, for example, may generate and provide white light.

The light source unit LU may include at least one light source LS which generates light and a circuit board CB on which the light source LS mounted on one surface thereof and configured to supply power to the light source LS. The light source LS may be a light-emitting diode ("LED"). When viewed from a thickness direction DR3 of the display device 10, the circuit board CB may have a rectangular shape. The light source LS may be provided in plurality within the light source unit LU and the light sources LS may be disposed on the circuit board CB by being spaced apart from each other in a first direction DR1.

In the exemplary embodiment of the display device 10 according to the invention, although an example describes that the light source unit LU is included to correspond to only a light entrance surface (101 of FIG. 2) of the light guide plate LGP, the invention is not limited thereto. The light source unit LU may be provided in plural and respectively disposed on other surfaces (102, 105, and 106 of FIG. 2) of the light guide plate LGP such that other surfaces may also serve as a light entrance surface.

The light guide plate LGP may be provided under the display panel DP. The light guide plate LGP may include or be formed of a transparent polymer resin or glass. When the light guide plate LGP includes or is formed of the polymer resin, the light guide plate LGP, for example, may include at least one of polycarbonate, polymethyl methacrylate, polydimethylsiloxane, polystyrene or methacrylate styrene. The light guide plate LGP will be described in more detail later.

Although not shown in the drawings, for an exemplary embodiment of the display device 10 according to the invention, an optical member may be provided between the display panel DP and the light guide plate LGP. The optical member improves the brightness and viewing angle of the light emitted to a light exit surface (103 of FIG. 2) of the light guide plate LGP. The optical member may collectively include a first optical member, a second optical member and a third optical member which are sequentially stacked.

The first optical member may be a diffuser sheet for diffusing the light emitted from the light guide plate LGP. The second optical member may be a prism sheet for focusing the light diffused from the diffuser sheet in a direction perpendicular to a plane of the top display panel DP. The third optical member may be a protective sheet for protecting the prism sheet from external impact. A plurality of sheets of at least one of the first optical member, the second optical member and the third optical member may be overlapped and used as the collective optical member, and alternatively, at least one of the above-described sheets may be omitted if necessary.

Although not shown in the drawings, an exemplary embodiment of the backlight unit BLU may further include a reflective sheet. The reflective sheet may be provided under the light guide plate LGP. The reflective sheet changes a path of light in order for the light to propagate in a direction toward the display panel DP by reflecting the light provided from the light guide plate LGP which does not initially propagate in the direction toward the display panel DP and is leaked. Accordingly, the reflective sheet increases the amount of light which is provided toward the display panel DP.

Although not shown in the drawings, an exemplary embodiment of the display device 10 according to the invention may further include a bottom chassis. The bottom chassis may be provided under the backlight unit BLU. The bottom chassis may accommodate components of the backlight unit BLU and the display panel DP therein.

Although not shown in the drawings, an exemplary embodiment of the display device 10 according to the invention may further include a mold frame. The mold frame may be provided between the display panel DP and the backlight unit BLU. The mold frame may be provided under the display panel DP and along edges of the display panel DP to support the display panel DP from thereunder.

The display panel DP is provided on the backlight unit BLU. The display panel DP is not a self-emissive display panel, such as an organic light emitting display panel. Since the display panel DP is not a self-emissive display panel, a separate backlight unit BLU generates and provides light to the display panel DP. In an exemplary embodiment, for example, various display panels, such as a liquid crystal display ("LCD") panel or an electrophoretic display panel ("EDP"), may be used. Hereinafter, exemplary embodiments of the invention will be described with the display panel DP as a liquid crystal display panel.

Figure 2:
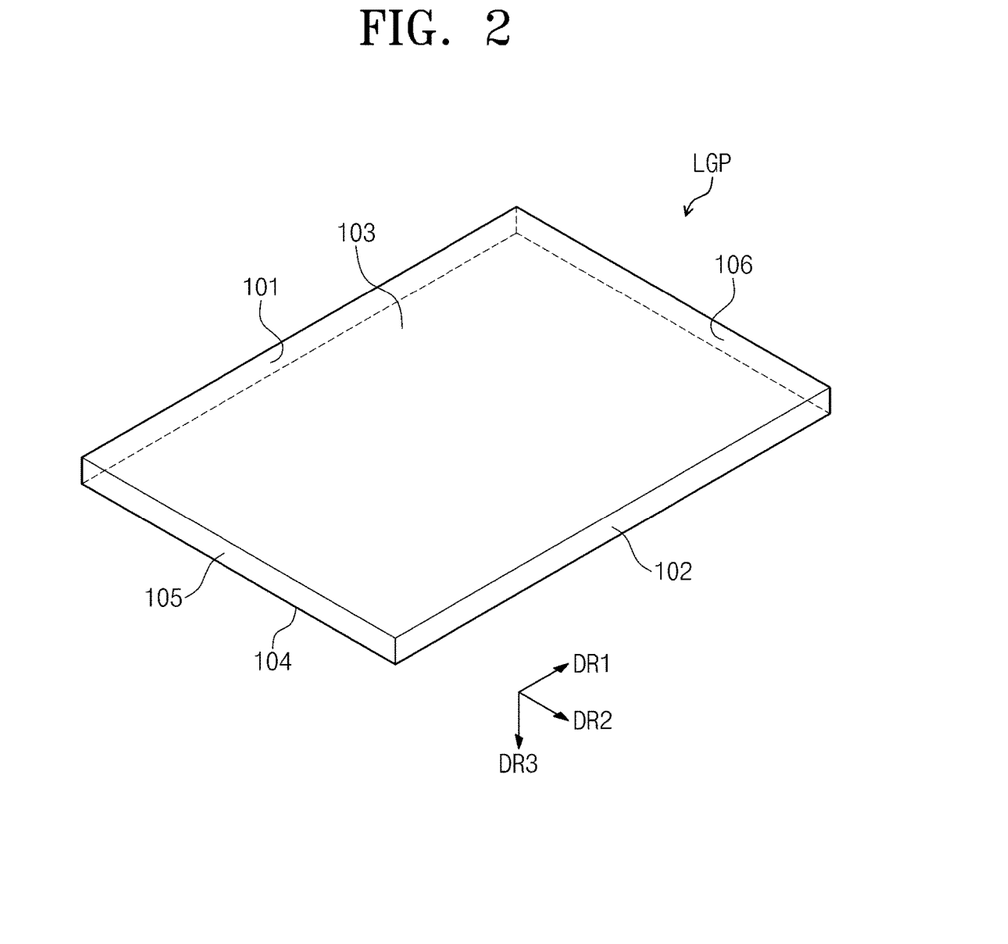
FIG. 2 is a perspective view schematically illustrating an exemplary embodiment of a light guide plate included in a display device according to the invention.

FIG. 2 is a perspective view schematically illustrating an exemplary embodiment of a light guide plate included in a display device according to the invention.

Referring to FIGS. 1 and 2, the light guide plate LGP emits light by guiding the light generated by and provided from the light source unit LU. The light guide plate LGP guides the light provided from the light source unit LU toward the display panel DP. The light entered into the inside of the light guide plate LGP is emitted toward the display panel DP through the light exit surface 103 of the light guide plate LGP. The light guide plate LGP includes the light entrance surface 101, a light opposite surface 102, the light exit surface 103, a rear surface 104, a first side surface 105 and a second side surface 106.

The light entrance surface 101 receives light from the light source unit LU and the received light passes through the light entrance surface 101 to enter the inside of the light guide plate LGP. The light entrance surface 101 is provided adjacent to and facing the light source unit LU. The light entrance surface 101 is connected to the light exit surface 103, the rear surface 104, the first side surface 105 and the second side surface 106. The light entrance surface 101 is opposite to the light opposite surface 102.

The light opposite surface 102 is opposite to the light entrance surface 101. The light opposite surface 102, for example, may be spaced apart from the light entrance surface 101 in a second direction DR2. The light opposite surface 102 is connected to the light exit surface 103, the rear surface 104, the first side surface 105 and the second side surface 106.

The light exit surface 103 emits the light which is provided from the light entrance surface 101 and guided within the light guide plate LGP. The light exit surface 103 is provided adjacent to and facing the display panel DP. The light exit surface 103 is connected to the light entrance surface 101, the light opposite surface 102, the first side surface 105 and the second side surface 106. The light exit surface 103 is opposite to the rear surface 104.

The rear surface 104 is opposite to the light exit surface 103. The rear surface 104, for example, may be spaced apart from the light exit surface 103 in a third direction DR3. The rear surface 104 is connected to the light entrance surface 101, the light opposite surface 102, the first side surface 105 and the second side surface 106.

The first side surface 105 is connected to the light entrance surface 101, the light opposite surface 102, the light exit surface 103 and the rear surface 104.

The second side surface 106 may be spaced apart from the first side surface 105 in the first direction DR1. The second side surface 106 is connected to the light entrance surface 101, the light opposite surface 102, the light exit surface 103 and the rear surface 104.

Figure 3A:
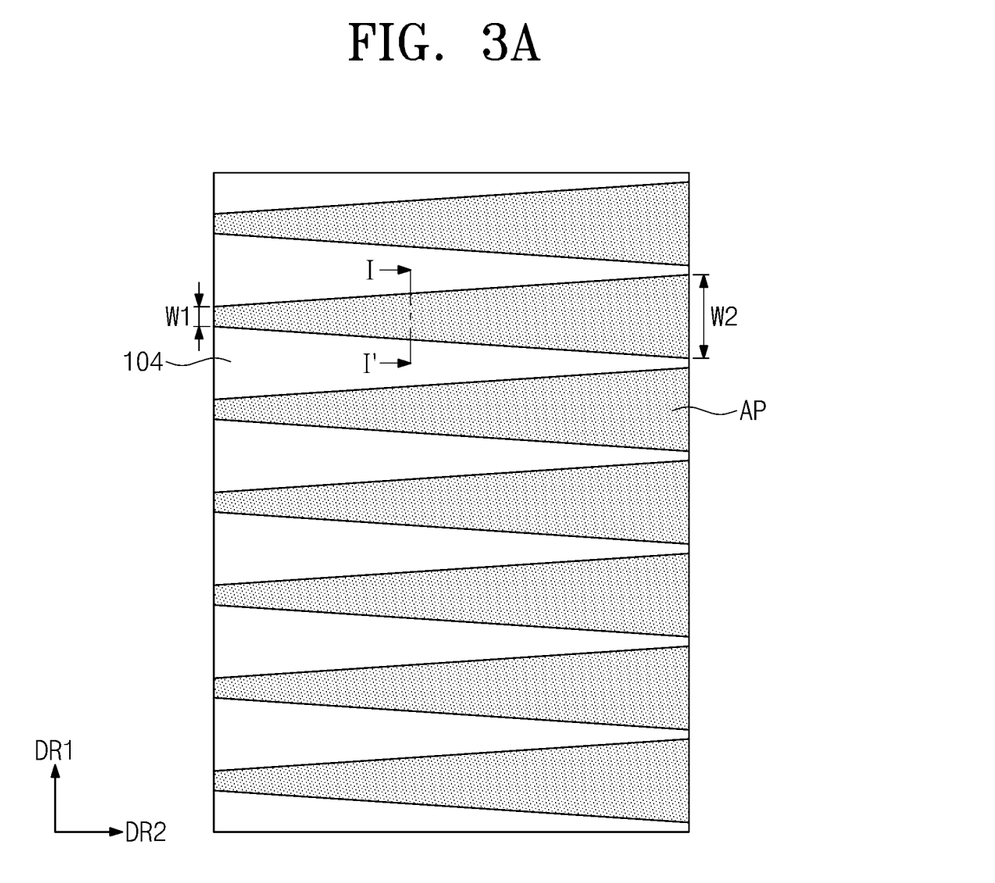
FIG. 3A is a plan view schematically illustrating an exemplary embodiment of absorption patterns relative to a light guide plate included in a display device according to the invention.
Figure 3B:
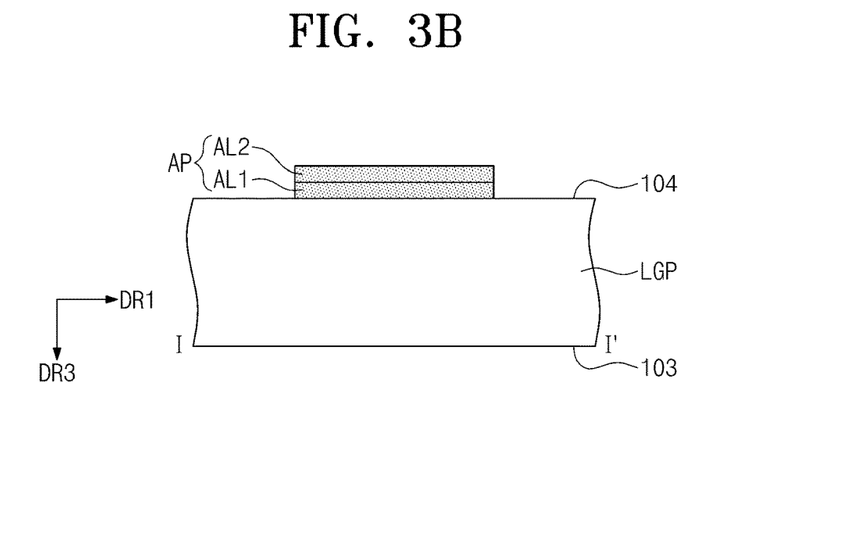
FIG. 3B is a schematic cross-sectional view corresponding to line I-I' of FIG. 3A.

FIG. 3A is a plan view schematically illustrating an exemplary embodiment of absorption patterns relative to a light guide plate included in a display device according to the invention. FIG. 3B is a schematic cross-sectional view corresponding to line I-I' of FIG. 3A.

Referring to FIGS. 3A and 3B, an exemplary embodiment of a display device 10 according to the invention may further include an absorption filter AP provided in plural as the absorption patterns. The absorption filters AP are provided under the light guide plate LGP. The absorption filters AP, for example, may be provided on the rear surface 104 of the light guide plate LGP. The absorption filters AP overlap a portion of the rear surface 104 in a plan view of the rear surface 104 of the light guide plate LGP. The absorption filters AP may respectively correspond to a light source LS, but are not limited thereto.

The absorption filters AP may be spaced apart from each other in the first direction DR1 and lengths of the absorption filters AP may extend in the second direction DR2 crossing the first direction DR1. A width taken in the first direction DR1 of each of the absorption filters AP may increase from the light entrance surface 101 toward the light opposite surface 102. Each of the absorption filters AP has a first width W1 at the light entrance surface 101 and a second width W2 at the light opposite surface 102 in the plan view. The first width W1 may be smaller than the second width W2.

Among the absorption filters AP disposed overlapping the light guide plate LGP, a sum of the first width W1 and the second width W2 of any one of the absorption filters AP may be the same as a sum of the first width W1 and the second width W2 of an adjacent absorption filter AP. When the sum of the first width W1 and the second width W2 of the any one of the absorption filters AP is the same as the sum of the first width W1 and the second width W2 of the adjacent absorption filter AP, total areas of the absorption filters AP may be the same as each other in the plan view. Accordingly, an amount of light absorbed by each of the absorption filters AP may be constant.

Referring to FIG. 3B, each of the absorption filters AP may include a first absorption layer AL1 and a second absorption layer AL2. In FIG. 3B, although illustrated as an example that the number of the first absorption layer AL1 is one and the number of the second absorption layer AL2 is one in each of the absorption filters AP, the invention is not limited thereto. In an alternative exemplary embodiment, at least one of the first absorption layer AL1 and the second absorption layer AL2 in each of the absorption filters AP may be provide in plurality.

The first absorption layer AL1 may have a first refractive index. The first refractive index, for example, may be in a range of about 2.0 to about 2.5. The first absorption layer AL1, for example, may have a trapezoidal shape in the plan view thereof. A material used as the first absorption layer AL1 is not particularly limited and, for example, may include at least one of $ZrO_2$ and polymethyl methacrylate. A width of the first absorption layer AL1 may increase from the light entrance surface 101 toward the light opposite surface 102. Opposing edges of the first absorption layer AL1 in the width direction thereof may define opposing edges of the absorption filter AP in the width direction thereof.

The second absorption layer AL2 may have a second refractive index. The second refractive index may be lower than the first refractive index. The second refractive index, for example, may be in a range of about 1.2 to about 1.7. The second absorption layer AL2, for example, may have a trapezoidal shape in the plan view thereof. A material used as the second absorption layer AL2 is not particularly limited and, for example, may include at least one of $SiO_2$ and polyethylene naphthalate. A width of the second absorption layer AL2 may increase from the light entrance surface 101 toward the light opposite surface 102. Opposing edges of the second absorption layer AL2 in the width direction thereof may define opposing edges of the absorption filter AP in the width direction thereof.

Figure 3C:
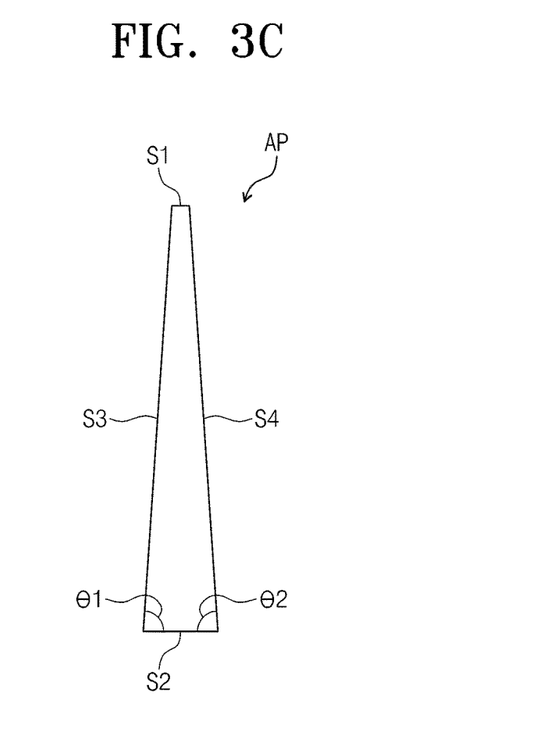
FIG. 3C is a top plan view schematically illustrating an exemplary embodiment of a single absorption pattern which is included in a display device according to the invention.

FIG. 3C is a top plan view schematically illustrating an exemplary embodiment of a single absorption pattern which is included in a display device according to the invention.

Referring to FIGS. 1, 2, and 3A to 3C, each of the absorption filters AP as an absorption pattern may have a trapezoidal shape in a top plan view thereof. The trapezoidal shape, for example, may be an isosceles trapezoidal shape. Shapes of the absorption filters AP and sizes of the shapes may respectively be the same as each other, but the invention is not limited thereto. In FIG. 3A, although an example describes that the shapes of the absorption filters AP are the same as each other in the plan view, the invention is not limited thereto. In an alternative exemplary embodiment, while planar areas of the absorption filters AP are the same as each other in the plan view, at least one of the shapes of the absorption filters AP may be different from that of remaining absorption filters AP. Also, in FIG. 3A, although an example describes that the sizes (e.g., planar areas) of the absorption filters AP are the same as each other in the plan view, the invention is not limited thereto. In an alternative exemplary embodiment, while the shapes of the absorption filters AP are the same as each other in the plan view, at least one of the sizes of the absorption filters AP may be different from that of remaining absorption filters AP.

Referring to FIG. 3C, the trapezoidal shape may define a first side S1, a second side S2, a third side S3 and a fourth side S4 of the absorption filter AP. The first side S1 is provided at the light entrance surface 101. The first side S1 may be coplanar with the light entrance surface 101, but the invention is not limited thereto. The light entrance surface 101 extends in a length direction thereof, for example, the first direction DR1. In the length direction of the light entrance surface 101, a length of the first side S1 may be smaller than a length of the second side S2.

The second side S2 is provided at the light opposite surface 102. The second side S2 may be coplanar with the light opposite surface 102, but the invention is not limited thereto. The second side S2 may be spaced apart from the first side S1 in the second direction DR2. The second side S2 is connected to the third side S3 and the fourth side S4.

The third side S3 is connects the first side S1 and the second side S2 to each other. The fourth side S4 is spaced part from the third side S3. The fourth side S4 may connect the first side S1 and the second side S2 to each other.

The first side S1 may define the first width W1 of the absorption filter AP and the second side S2 may define the second width W2 of the absorption filter AP. Sums of the lengths of the first sides S1 and the second sides S2 of the absorption filters AP may be the same as each other. That is, among the absorption filters AP disposed relative to a light guide plate, the sum of the first side S1 and the second side S2 of any one of the absorption filters AP may be the same as the sum of the first side S1 and the second side S2 of an adjacent absorption filter.

An angle θ1 between the second side S2 and the third side S3 may be the same as an angle θ2 between the second side S2 and the fourth side S4. However, the invention is not limited thereto, and the angle θ1 between the second side S2 and the third side S3 may be different from the angle θ2 between the second side S2 and the fourth side S4.

Figure 4A:
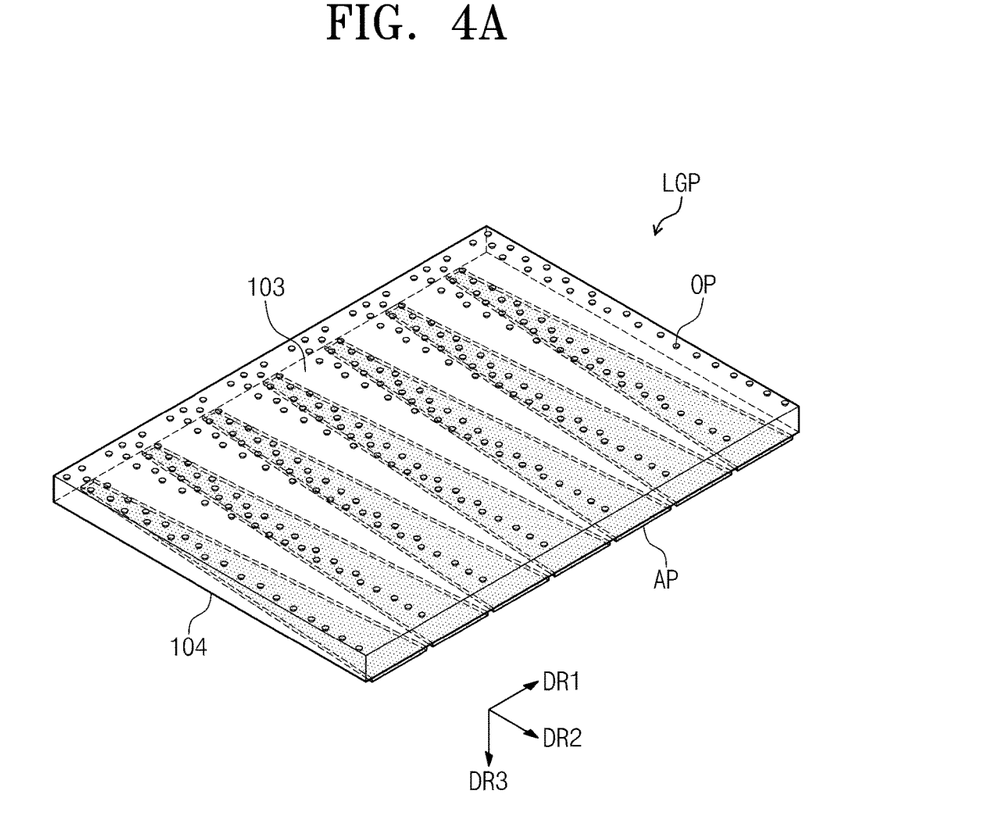
FIG. 4A is a perspective view schematically illustrating an exemplary embodiment of absorption patterns and optical patterns relative to a light guide plate included in a display device according to the invention.
Figure 4B:
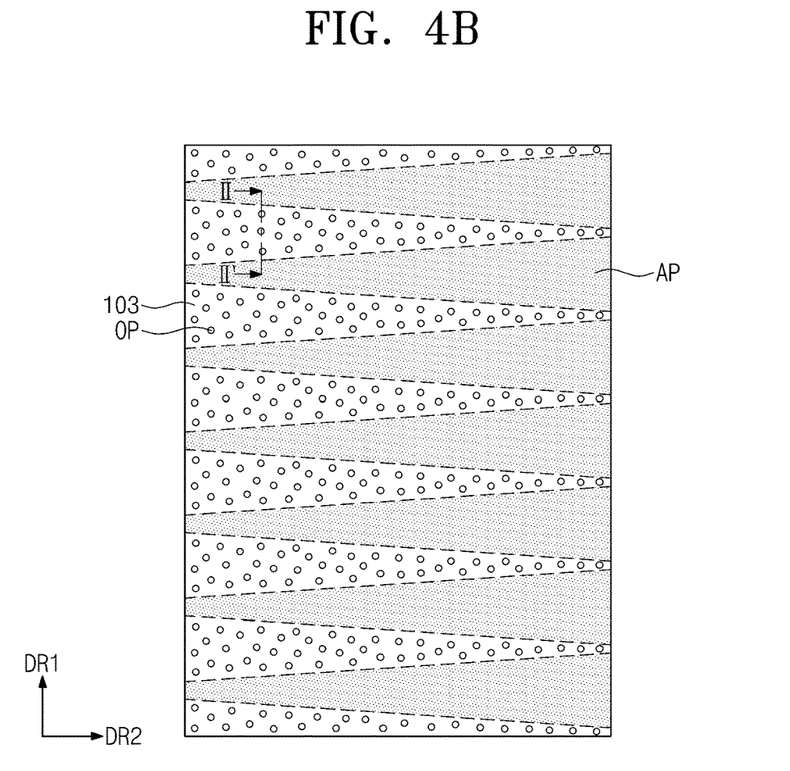
FIG. 4B is a top plan view of FIG. 4A.
Figure 4C:
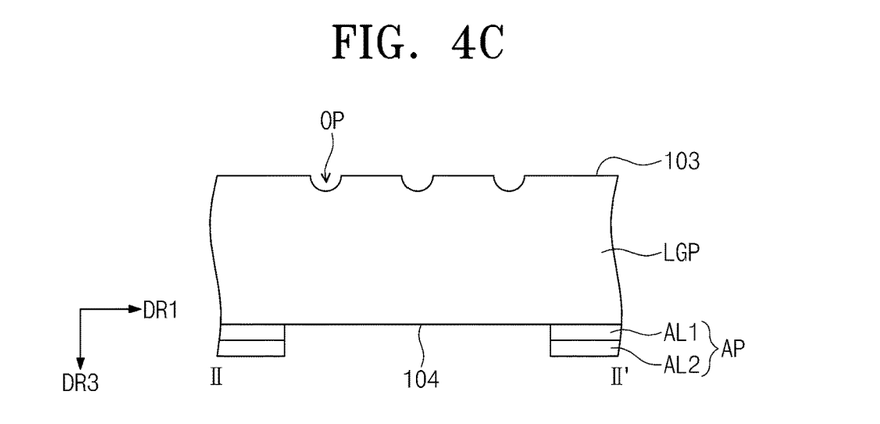
FIG. 4C is a schematic cross-sectional view corresponding to line II-II' of FIG. 4B.

FIG. 4A is a perspective view schematically illustrating an exemplary embodiment of absorption patterns and optical patterns relative to a light guide plate included in a display device according to the invention. FIG. 4B is a plan view of FIG. 4A. FIG. 4C is a schematic cross-sectional view corresponding to line II-II' of FIG. 4B.

Figure 5A:
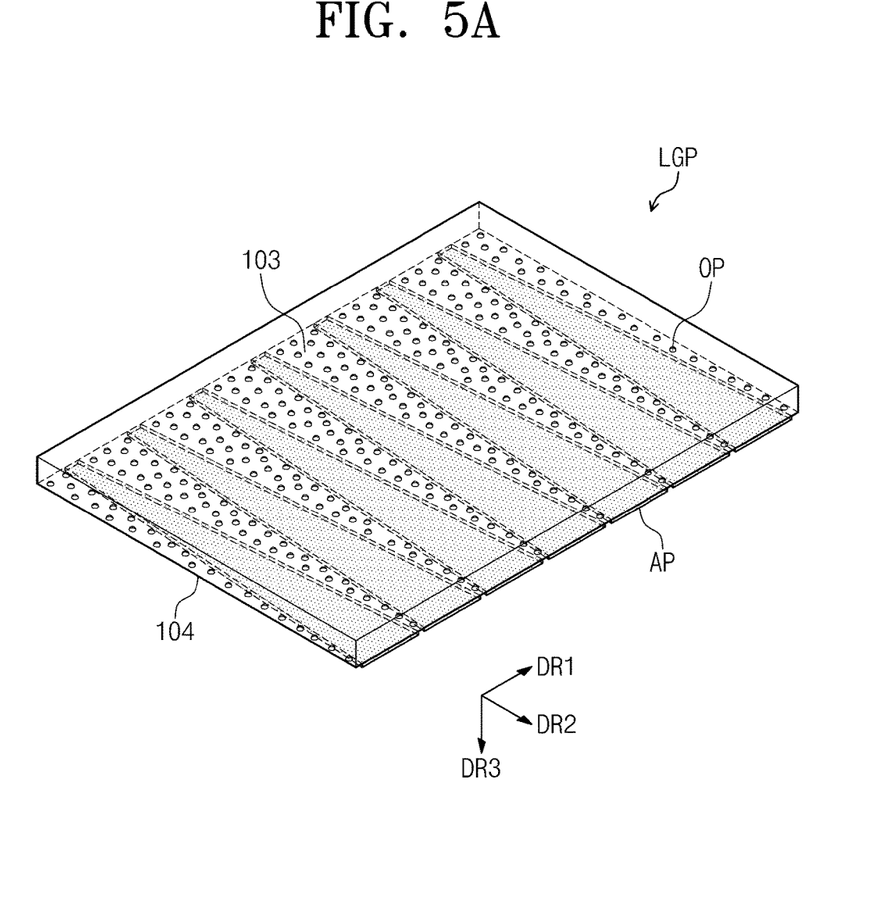
FIG. 5A is a perspective view schematically illustrating another exemplary embodiment of absorption patterns and optical patterns relative to a light guide plate included in a display device according to the invention.
Figure 5B:
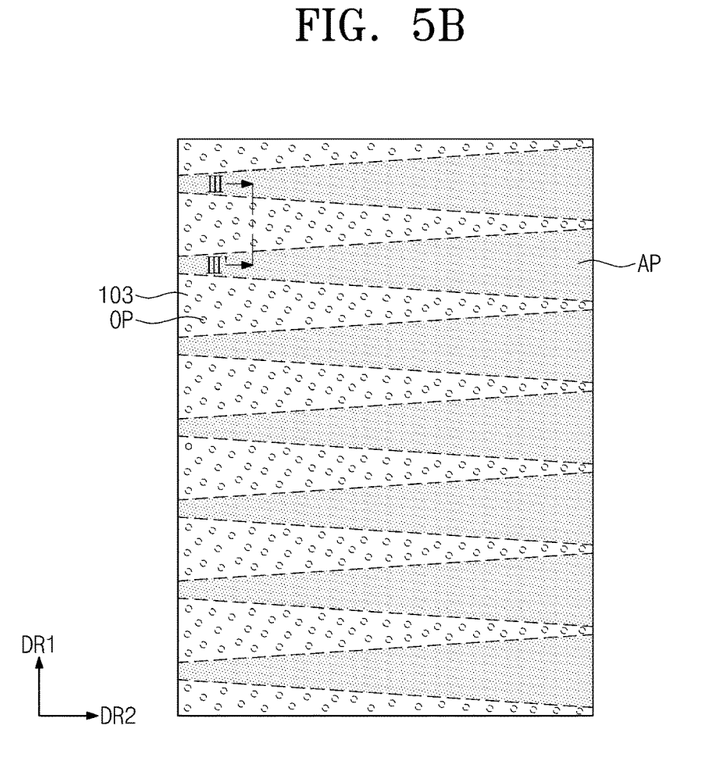
FIG. 5B is a top plan view of FIG. 5A.
Figure 5C:
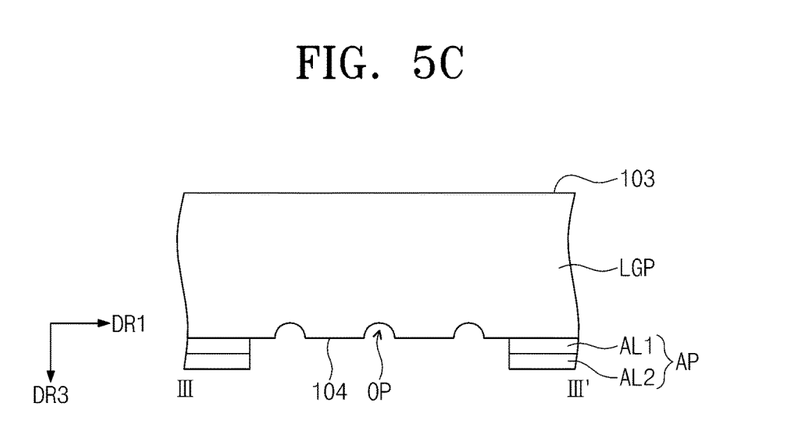
FIG. 5C is a schematic cross-sectional view corresponding to line III-III' of FIG. 5B.

FIG. 5A is a perspective view schematically illustrating another exemplary embodiment of absorption patterns and optical patterns relative to a light guide plate included in a display device according to the invention. FIG. 5B is a plan view of FIG. 5A. FIG. 5C is a schematic cross-sectional view corresponding to line of FIG. 5B.

Referring to FIGS. 4A to 4C and 5A to 5C, an exemplary embodiment of the display device 10 according to the invention may further include an optical pattern OP provided in plural. The optical patterns OP totally reflect light. Each of the optical patterns OP may have a circular shape in a plan view. However, the invention is not limited thereto and each of the optical patterns OP may have various shapes, such as a triangular shape, a rectangular shape and an oval shape in the plan view.

In FIGS. 4A to 4C and 5A to 5C, although an example describes that the shapes of the optical patterns OP are the same as each other, the invention is not limited thereto. The shape of at least one of the optical patterns OP may be different in the plan view thereof. Also, in FIGS. 4A to 4C and 5A to 5C, although an example describes that sizes of the optical patterns OP are the same as each other, the invention is not limited thereto. The size of at least one of the optical patterns OP may be different in the plan view thereof.

Referring to FIGS. 4A to 4C, the optical patterns OP may be provided at the light exit surface 103. Each of the optical patterns OP, for example, may be provided at the light exit surface 103 in the form of a groove defined recessed from the light exit surfaced 103. Each of the optical patterns OP, for example, may be concave when viewed in the thickness direction DR3 of the display panel (DP of FIG. 1). Portions of the light guide plate LGP may define the optical patterns OP.

The optical patterns OP provided at the light exit surface 103 may totally reflect light to provide the light to the display panel (DP of FIG. 1). The optical patterns OP may not overlap the absorption filters AP as absorption patterns in a plan view of the light guide plate LGP. However, the invention is not limited thereto, and a portion of the optical patterns OP may overlap the absorption filters AP.

Referring to FIGS. 5A to 5C, the optical patterns OP may be provided at the rear surface 104. Each of the optical patterns OP, for example, may be provided at the rear surface 104 in the form of a groove recessed from the rear surface 104. Each of the optical patterns OP, for example, may be convex when viewed in the thickness direction DR3 of the display panel (DP of FIG. 1). Portions of the light guide plate LGP may define the optical patterns OP.

The optical patterns OP provided at the rear surface 104 may totally reflect light to provide the light incident thereto to the inside of the light guide plate LGP. The optical patterns OP may not overlap the absorption filters AP in the plan view of the light guide plate LGP. However, the invention is not limited thereto, and a portion of the optical patterns OP may overlap the absorption filters AP.

With respect to a typical display device, since a light guide plate absorbs a relatively short-wavelength light among the light provided by a light source unit, a color of the light emitted from a region of a light exit surface adjacent to a light entrance surface and a color of the light emitted from a region of the light exit surface adjacent to a light opposite surface are different from each other. For example, in a conventional display device when the light source unit provides white light, white light is emitted from the region of the light exit surface adjacent to the light entrance surface and yellow light is emitted from the region of the light exit surface adjacent to the light opposite surface. Accordingly, color deviation occurs among light provided from the light guide plate and display quality of the display device may deteriorate.

However, in one or more exemplary embodiments of the invention, since the display device may include the light guide plate which is configured to absorb relatively long-wavelength light, the display device may reduce color deviation between a color of the light emitted from a region of the light exit surface adjacent to the light entrance surface and a color of the light emitted from a region of the light exit surface adjacent to the light opposite surface. Also, an amount of the wavelength adsorbed by the absorption filters may be increased closer to the light opposite surface by the width of each of the absorption filters increasing from the light entrance surface toward the light opposite surface. Accordingly, one or more exemplary embodiment of the display device according to the invention may reduce the color deviation that occurs in light provided from the light guide plate and may improve the display quality of the display device using such provided light.

The display quality of a display device may be improved by one or more exemplary embodiments of the display device according to the invention.

Although exemplary embodiments of the invention have been shown and described with reference to the accompanying drawings, it will be understood by those of ordinary skill in the art that various changes in form and details may be made therein without departing from the spirit and scope of the invention as defined by the following claims. Accordingly, it is to be understood that the invention has been described by way of illustration and not limitation.

What is claimed is:

1. A display device comprising:
    a display panel which displays an image with light;
    a light guide plate through which the light is guided and which guides the light to the display panel, the light guide plate defining:
        a light exit surface thereof from which the light is emitted to the display panel,
        a rear surface thereof opposite to the light exit surface, a light entrance surface thereof through which the light is received and which connects the light exit surface and the rear surface to each other, and a light opposite surface thereof opposite to the light entrance surface; and an absorption filter provided in plural on the rear surface of the light guide plate, wherein the absorption filters on the rear surface of the light guide plate each comprise:

a first absorption layer having a first refractive index; and a second absorption layer having a second refractive index lower than the first refractive index, wherein the first absorption layer is disposed between the light guide plate and the second absorption layer, and a width of each absorption filter increases from the light entrance surface toward the light opposite surface.

2. The display device of claim 1, wherein among the absorption filters on the rear surface of the light guide plate, areas of the absorption filters are the same as each other in a plan view.

3. The display device of claim 1, wherein among the absorption filters on the rear surface of the light guide plate, in a plan view, each absorption filter defines a first width thereof at the light entrance surface and a second width thereof at the light opposite surface, and a sum of the first width and the second width of any one absorption filter is the same as a sum of the first width and the second width of an adjacent absorption filter.

4. The display device of claim 3, wherein the first width is smaller than the second width.

5. The display device of claim 1, wherein among the absorption filters on the rear surface of the light guide plate, each absorption filter has a trapezoidal shape in a plan view.

6. The display device of claim 5, wherein the trapezoidal shape defines:

a first side thereof at the light entrance surface of the light guide plate;

a second side thereof at the light opposite surface of the light guide plate;

a third side thereof which connects the first side and the second side to each other; and a fourth side thereof which is spaced apart from the third side and connects the first side and the second side to each other, and wherein in a width direction of the absorption filter, a length of the first side is smaller than a length of the second side.

7. The display device of claim 6, wherein among the absorption filters on the rear surface of the light guide plate, respective sums of the lengths of the first sides and the second sides of the absorption filters are the same as each other.

8. The display device of claim 6, wherein an angle between the second side and the third side is the same as an angle between the second side and the fourth side.

9. The display device of claim 1, wherein among the absorption filters on the rear surface of the light guide plate, shapes of the absorption filters and planar sizes of the absorption filters defined by the shapes thereof are respectively the same.

10. The display device of claim 1, wherein among the absorption filters on the rear surface of the light guide plate, the absorption filters are spaced apart from each other in a first direction and lengths thereof extend in a second direction crossing the first direction.

11. The display device of claim 1, wherein the first absorption layer comprises at least one of $ZrO_2$ and polymethyl methacrylate.

12. The display device of claim 1, wherein the second absorption layer comprises at least one of $SiO_2$ and polyethylene naphthalate.

13. The display device of claim 1, wherein the light guide plate further defines an optical pattern which is provided in plural and totally reflects the light guided by the light guide plate.

14. The display device of claim 13, wherein the optical patterns are defined at the light exit surface of the light guide plate.

15. The display device of claim 13, wherein the optical patterns are defined at the rear surface of the light guide plate.

16. The display device of claim 1, wherein the light guide plate comprises at least one of polycarbonate, polymethyl methacrylate, polydimethylsiloxane, polystyrene and methacrylate styrene.

17. The display device of claim 1, further comprising a light source unit which generates and provides the light to the light guide plate, wherein the light provided by the light source unit comprises white light.

18. A display device comprising:

a display panel which displays an image with light;

a light guide plate through which the light is guided and which guides the light to the display panel, the light guide plate defining:

a light exit surface thereof from which light is emitted toward the display panel, a rear surface thereof opposite to the light exit surface, a light entrance surface thereof through which the light is received and which connects the light exit surface and the rear surface to each other, and a light opposite surface thereof which is opposite to the light entrance surface and connects the light exit surface and the rear surface to each other; and an absorption filter pattern provided in plural separated from each other on the rear surface of the light guide plate, wherein each of the absorption filter patterns on the rear surface of the light guide plate comprises:

a first absorption layer pattern provided in plural separated from each other on the rear surface of the light guide plate, each first absorption layer pattern having a first refractive index; and a second absorption layer pattern provided in plural separated from each other on the rear surface of the light guide plate, each second absorption layer pattern having a second refractive index lower than the first refractive index, and a width of each first absorption layer pattern and each of the second absorption layer pattern increases from the light entrance surface toward the light opposite surface.

* * * * *